United States Patent [19]

Nally

[11] 4,386,562
[45] Jun. 7, 1983

[54] BAR CODE PRINTER

[75] Inventor: Robert B. Nally, Waterloo, Canada

[73] Assignee: NCR Canada Ltd - NCR Canada LTEE, Mississauga, Canada

[21] Appl. No.: 356,588

[22] Filed: Mar. 9, 1982

Related U.S. Application Data

[63] Continuation of Ser. No. 135,818, Mar. 31, 1980, abandoned.

[51] Int. Cl.³ .............................................. B41L 47/46
[52] U.S. Cl. .................................... 101/91; 101/93.18
[58] Field of Search ..................................... 101/91–92, 101/93.04, 93.18–93.27, 93.45, 93.46

[56] References Cited

U.S. PATENT DOCUMENTS

| | | | |
|---|---|---|---|
| 1,423,325 | 7/1922 | Heberling | 101/91 X |
| 2,980,014 | 4/1961 | Bonsch | 101/91 |
| 3,289,805 | 12/1966 | Kleinschmidt | 101/93.18 X |
| 3,455,237 | 7/1969 | Trab | 101/91 |
| 3,736,867 | 6/1973 | Bates | 101/45 |
| 3,769,906 | 11/1973 | Martin | 101/91 |
| 3,924,532 | 12/1975 | Hubbard | 101/92 X |

*Primary Examiner*—A. J. Heinz
*Attorney, Agent, or Firm*—J. T. Cavender; Wilbert Hawk, Jr.; Richard W. Lavin

[57] ABSTRACT

A printing system for printing coded bar elements on a record member include a rotatable drum member having slidably mounted print elements disposed about its periphery. An actuator member positioned adjacent the drum member engages one of the print elements upon movement of the drum member to position a print element adjacent a record member. The actuator member is operated to slide the engaged print element to a printing position enabling the print element to print a coded bar on the record member.

5 Claims, 5 Drawing Figures

FIG. I

BAR CODE PRINTER

This application is a continuation of application Ser. No. 135,818, filed 3-31-80 now abandoned.

BACKGROUND OF THE INVENTION

The present invention is directed to processing documents such as bank checks and more particularly to an apparatus for printing coded bars on the back of a bank check for use in processing the check.

As disclosed in the co-pending U.S. Pat. No. 4,201,978, entitled "Document Processing System" and assigned to the assignee of the present application, modern-day check processing systems include the listing and balancing of amounts for use in proving the documents, encoding information on a check for use in distributing the checks, endorsing, microfilming, sorting and distributing the checks in accordance with their final destination. As a further part of this processing system, information is printed on the back of the check which includes a document identification number (DIN) which may comprise the account number of the writer of the check, the date, the processing operator I.D., the identification of the processing machine and any other information necessary for processing the check.

Prior processing systems have employed magnetic printers and readers, together with optical character recognition apparatus for reading such machine-printed characters. The cost of such a processing apparatus is considerable. In order to reduce the overall cost of such processing apparatus, it has been proposed to use a bar code printer for printing the DIN number on the document with a bar representing a binary 1 and a space representing a binary 0 in a manner that is well-known in the art. Prior bar code printers such as those disclosed in U.S. Pat. No. 3,924,532 and No. 4,057,015 do not provide a construction which could be readily incorporated into many document processing consoles, such as, for example, of the type disclosed in the above cited patent application, for automatically printing coded bars on a document in response to the operation of a keyboard in which the data is entered by an operator reading the information from the document. It is therefore an object of this invention to provide a printer which will print coded bars on a document during the time the document is being transported through a check processing apparatus. It is a further object of this invention to provide a bar code printer which is of simple construction and therefore low in cost.

SUMMARY OF THE INVENTION

In order to carry out these objects, there is provided a bar code printer which includes a rotatably-mounted drum member having a plurality of slots extending lengthwise along its peripheral surface. Slidably mounted on each of the slots is an elongated bar code printing element, one end of which comprises the printing element and the other end having a depending arm portion. A stationary actuator member positioned adjacent the arm portions of each of the printing elements when in a home position is selectably operated to slidably move a printing element to its printing position to print a bar element on a document. Embodiments are disclosed wherein the actuator member is positioned to move a single printing element to a printing position prior to the printing operation or a plurality of printing elements prior to the printing operation.

DESCRIPTION OF THE PREFERRED EMBODIMENT

Figure 1:
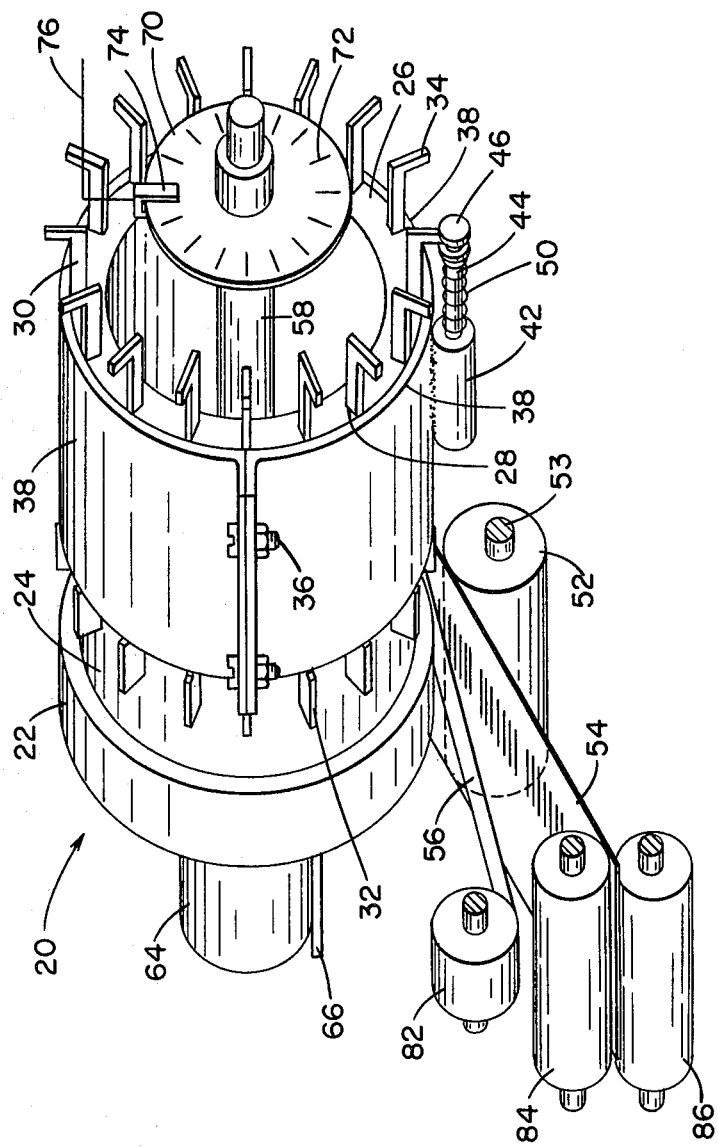
FIG. 1 is a perspective view of one embodiment of the bar code printer showing the actuator member located at the printing position.

Referring now to FIG. 1, there is shown a perspective view of one embodiment of the bar code printer generally indicated by the numeral 20 and which includes a cylinder shaped drum member 22 having a recessed portion 24 and a front portion 26 in which are located a plurality of longitudinal slots 28 (FIG. 2) extending around the peripheral edge of the front portion 26. Slidably positioned in each of the slots 28 is an elongated printing member 30, one end of which comprises a bar printing element 32 while the opposite end comprises a depending arm portion 34. The front portion 26 of the drum member 22 is slidably mounted within a pair of outer shell members 38 which are secured together by means of bolts 36. As better shown in FIG. 2, the lower shell 38 is secured to a supporting bracket 40 located within the framework of the check processing apparatus. Secured to one of the shell members 38 adjacent the arm portions 34 of the printing members 30 is a solenoid member 42 whose armature 44 extends in a direction parallel to the printing member 30. Secured to the end of the armature 44 is an actuator member 46 having a recessed portion 48 within which is positioned the end of the arm portion 34 of one of the printing members 30. As will be described more fully hereinafter, energizing of the solenoid 42 results in the inward movement of the armature 44 against the action of a compression spring 50. This inward movement of the armature 44 will move the engaged printing member 30 in a similar direction to position the bar printing element 32 thereof adjacent a printing platen comprising an offset mounted roller member 52 (FIGS. 1 and 2) secured to a shaft 53 which is journalled on the support brackets 40 and a companion bracket 66 and which is connected to a motor 55. Rotation of the roller member 52 results in such member moving a document 54 against an ink ribbon 56 and the positioned bar printing element 32 to print a bar on the face of the document 54. Upon deenergizing of the actuator member 42, the spring 50 will return the armature 44 and the printing member 30 to the home position where the element 32 of such member 30 is positioned free and clear of document 54 engagement.

Figure 2:
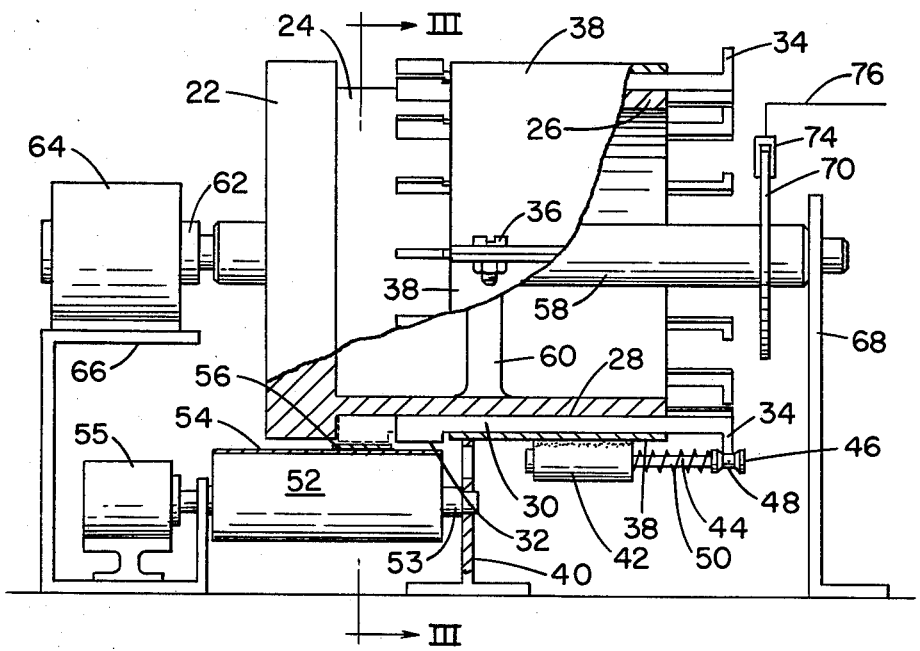
FIG. 2 is a side view of the bar code printer of FIG. 1 with a portion cut away showing details of the printing element and its engagement by the actuator member.
Figure 3:
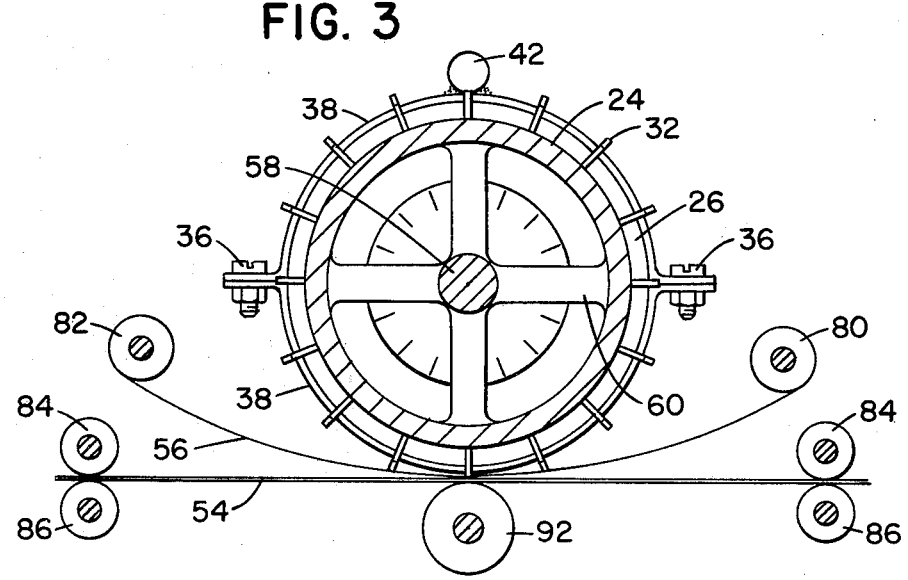
FIG. 3 is a modified embodiment of the bar code printer of FIG. 1 taken generally on line 3—3 of FIG. 2 showing a sectional end view in which the actuator member is positioned 180° from the printing position.

The drum member 22 is secured to a shaft 58 (FIGS. 1-3 inclusive) by means of rib members 60 (FIGS. 2 and 3). One end of the shaft 58 is secured to the drive shaft 62 of a motor member 64 mounted on the support bracket 66. The motor member 64 may be of the type known as a stepping motor in which the motor will rotate the drum member 22 a predetermined distance when energized. In the present embodiment, the operation of the motor member 64 will rotate the drum member 22 to position in succession the end of the arm portion 34 of each of the printing members 30 within the recessed portion 48 of the actuator member 46 for enabling the solenoid 42 to selectively move the printing elements 30 from home and to the position for printing a bar on the document 54. The other end of the shaft 58 is rotatably supported by a bracket 68 (FIG. 2) and has secured thereto a timing disc 70 on which is located a plurality of magnetic elements 72 (FIG. 1) and which disc 70 is associated with a pick-up member 74 for sensing the location of the shaft 58 and the drum member 22 in a manner that is well-known in the art. Signals generated by the pick-up member 74 are transmitted over a line 76 to a control unit 78 (FIG. 5) which employs the signals to control the energizing of the solenoid member 42 in a manner that will be described more fully hereinafter.

Associated with the bar code printer 20 (FIG. 1) is the inking ribbon 56 which is positioned adjacent the recessed portion 24 of the drum member 22 and which is driven by a take-up spool 80 (FIG. 2) from a supply spoll 82. Located adjacent the inking ribbon 56 is the document 54 on which the printing of the bars is to take place. The document 54, which in the present embodiment is a bank check, is driven past the drum member 22 by a pair of drive rollers 84 coacting with associated pressure rollers 86 (FIG. 3) in a manner that is well-known in the art.

Figure 5:
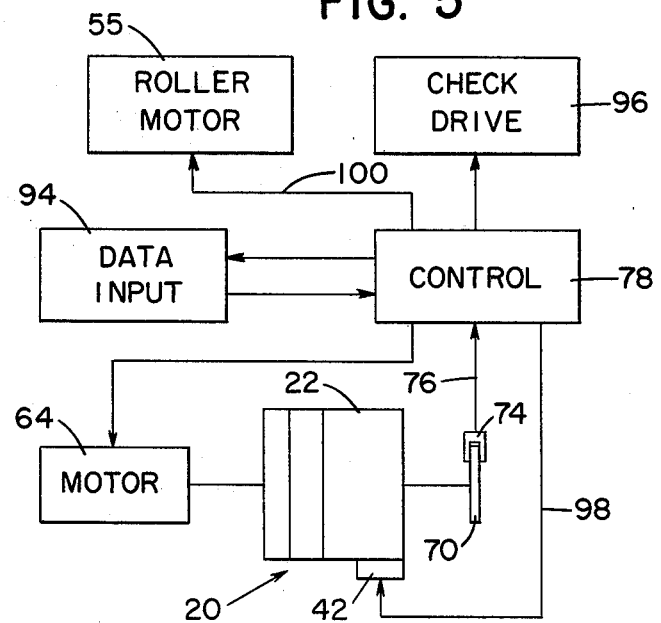
FIG. 5 is a block diagram of the control circuit for controlling the operation of the bar code printer.

Referring now to FIG. 5, there is shown a block diagram of the control circuit employed in the present embodiment for operating the bar code printer 20. Included in this circuit is the control unit 78 which receives binary data from a data input device 94 which, in the present embodiment, may include a keyboard device into which the operator will insert the data which is to be printed on the check. In response to the signals received over line 76 from the pick-up member 74, indicating the location of the drum member 22 with respect to the solenoid member 42, the control unit 78 will output energizing pulses to a check drive unit 96 which controls the operation of the drive rollers 84 (FIG. 3) to move the check document 54 to a printing position adjacent the recessed portion 24 of the drum member 22. At this time, the drum member 22 is located to position the end of the arm portion 34 of one of the printing members 30 within the recessed portion 48 of the actuator member 46. If a bar is to be printed on the check document 54 representing a binary 1, the control unit 78 will generate an energizing pulse over line 98 (FIG. 5) to the solenoid member 42 enabling the solenoid member to move the aligned printing member 30 so as to position the bar printing element 32 thereof adjacent the inking ribbon 56 and the document 54. The control unit 78 will then transmit an energizing pulse over line 100 to the moter 55 (FIG. 2) which will rotate the offset roller member 52 through one revolution resulting in the printing by the element 32 of a coded bar on the document 54. If a space representing a binary 0 is required at this time, the control unit 78 will operate the motor 64 which rotates the drum member 22 a distance to pass by such aligned printing member 30 so as to position the end of the arm portion 34 of the next printing member 30 within the recessed portion 48 of the actuator member 46 in preparation for the next printing cycle.

Referring now to FIG. 3, there is shown a second embodiment of the unique bar code printer in which the solenoid member 42 is located 180° from a pressure roller 92 similar to the roller member 52. This construction eliminates the need for a separate motor drive for the pressure roller 92 and for the document drive rollers 84. The pressure roller 92 coacting against the face of the printing bar element 32 to provide the necessary pressure to print the bar on the document 54. In the operation of the bar code printer of FIG. 3, the printing members 30 located between the solenoid member 42 and the pressure roller 92 are positioned in accordance with the data to be printed. In this construction, energizing of the solenoid member 42 positions a printing member 30 to print a coded bar in the manner described previously. While in a printing position, the drum member 22 is rotated a distance to position the solenoid member 42 between adjacent printing members 30 allowing the actuator member 46 to be disengaged from the end of the arm portion 34 of the actuated printing member 30. The solenoid member 42 at this time is deenergized, allowing the spring 50 to return the armature member 44 to its home position. The motor 64 is again energized to rotate the drum member 22 to a position enabling the solenoid member 42 to engage the next printing member 30 in preparation for a printing operation. It will be seen from this arrangement that a number of printing members 30 can be positioned in a printing position prior to the time the first bar is printed on the document 54 by the action of the pressure roller 92 against the inking ribbon 56. This arrangement also allows for the printing of the same information on a number of succeeding documents 54 if this is required. Rotation of the drum member 22 against the pressure roller 92 provides both a printing and driving operation on the document 54 in a manner that is well-known in the art. In order to provide a continuous printing operation of the drum member 22, the position of each of the printing members 30 is stored in a memory in the control unit 78 (FIG. 5) during one revolution of the drum member 22 enabling the control unit 78 to generate the proper energizing signals during the next revolution of the drum member 22 to provide the proper printing of the required data.

Figure 4:
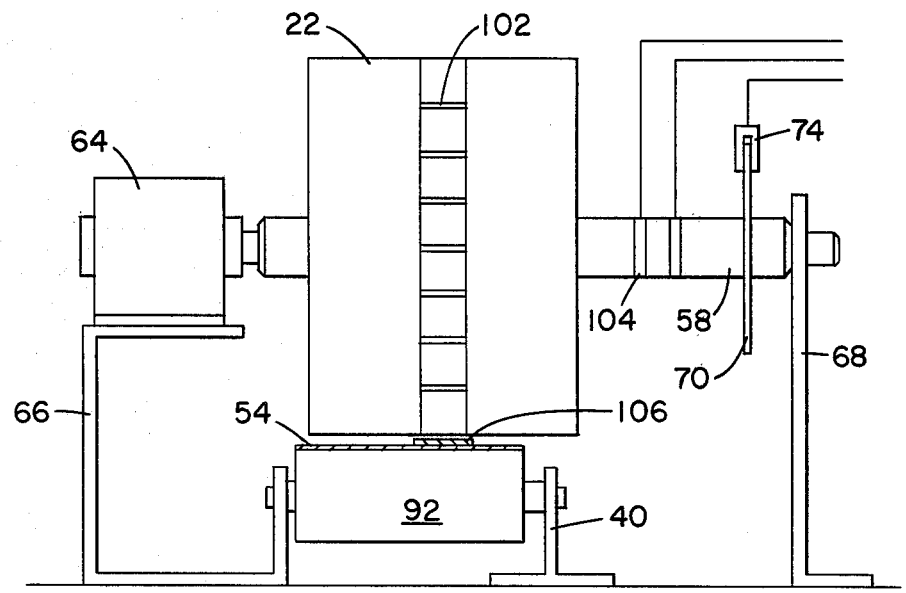
FIG. 4 is a side view of another embodiment of the bar code printer in which the printing elements comprise thermal print elements for printing coded bars on a document.

Referring now to FIG. 4, there is shown another embodiment of the present invention in which the bar printing elements comprise thermal print elements 102 of a type disclosed in U.S. Pat. No. 3,161,457 and assigned to the present assignee. Electrical power is supplied to each of the thermal print elements 102 through slip rings 104, it being understood that the two slip rings shown are merely exemplary and that as many slip rings as required to operate the print elements 102 are mounted on the shaft 58. The printing of a bar on a document 54 takes place against a thermal release ribbon 106 under the action of the pressure roller 92. It is the combined action of the pressure of the document 54 being held against the drum member 22 and the high temperature of the thermal print elements 102 that causes the ink transfer from the ribbon 106 to the document 54.

While the principles of the invention have now been made clear in an illustrated embodiment, it will be obvious to those skilled in the art that many modifications of structure, arrangements, elements and components can be made which are particularly adapted for specific environments without departing from those principles. The appended claims are therefore intended to cover and embrace any such modifications within the limits only of the true spirit and scope of the invention.

I claim:

1. A high-speed printing system for printing a plurality of coded bars on a record member representing a coded message comprising:

a rotatable drum member having a plurality of axially extending slots disposed about its periphery, said drum member having first and second axial end portions and includes a recessed portion in communication with said slots and extending in a circumferential direction adjacent said first end portion;

a plurality of elongated printing members each slidably mounted for axial movement in one of said slots having one end comprising a bar printing portion, said bar printing portion being slidable with said printing member from a first location adjacent said recessed portion to a printing location within said recessed portion and the opposite end comprising a depending arm portion positioned adjacent said second end portion;

means for feeding a record member to a printing position adjacent said recessed portion;

means for selectively rotating said drum member in which the bar printing portion of one of said printing members is positioned adjacent the record member;

a single actuator member positioned adjacent said second end portion and aligned with said printing position, said actuator member having means for engaging the depending arm portion of one of said printing members upon movement of said printing member to said printing position, means for moving said actuator member to thereby move said engaged printing member to locate the bar printing portion in said printing position when operated;

an inking member positioned between the record member and the bar printing portion of the positioned printing member;

means for positioning the record member against the inking member and the bar printing portion of a printing member when operated allowing said bar printer portion to print a coded bar on the record member;

and means secured to said drum member for generating control signals for operating said rotating means, and for moving successive bar printing portions from their first location to their printing location said actuator member and said positioning means enabling the printing portion of one of said printing members to print a coded bar on the record member.

2. The apparatus of claim 1 in which the actuator member comprises a solenoid mounted adjacent the drum member offset to said printing position.

3. The apparatus of claim 1 in which said actuator member comprises a solenoid member having an armature member, and said engaging means comprises an engaging member secured to said armature member and having a recessed portion positioned in the plane of movement of the depending arm portion of said printing members to engage the depending arm portion of one of said printing members upon movement of one of said printing members to a printing position.

4. The apparatus of claim 3 in which the positioning means includes an off-set mounted roller member positioned adjacent said record member and means for rotating said roller member through one revolution whereby said record member is moved into engagement with said inking member and the bar printing portion of one of said printing members during the first part of the revolution of the roller member and away from engagement with the inking member and the bar printing portion during a second part of the revolution of the roller member enabling the bar printing portion to print a bar code on the record member.

5. A high speed printing apparatus for printing a plurality of coded bars on a record member representing a coded message comprising:

a rotatable elongated drum member having a plurality of axially extending slots located about its periphery, said drum member having first and second axial end portions and a recessed portion extending in a circumferential direction adjacent said first end portion;

a plurality of elongated printing members each of which is slidably mounted in one of said slots, each printing member having one end comprising a bar printing portion said bar printing portion being slidable with said printing member from a first location adjacent said recessed portion to a printing location within said recessed portion and its opposite end comprising a depending arm portion extending outwardly adjacent the second end portion of said drum member;

means for feeding a record member to a printing position adjacent said recessed portion;

means for selectively rotating said drum member to said printing position in which the bar printing portion of each of said printing members is positioned adjacent the record member;

a single solenoid having an armature member positioned adjacent said drum member and aligned with said printing position;

an engaging member secured to one end of said armature member and having a recessed portion positioned to engage the depending arm portion of one of said printing members upon movement of said printing member to said printing position;

an inking member positioned between the record member and the bar printing portion of the positioned printing member;

an off-set roller member positioned adjacent said record member for moving the record member against the inking member and the bar printing portion of a printing member which when rotated allows said bar printer portion to print a coded bar on the record member;

driving means coupled to said off-set roller member for rotating said roller member when operated;

timing means secured to said driving means for generating control signals upon rotation of said drum member representing the location of a slot in said drum member;

and control means responsive to said control signals for operating said rotating means, and for moving successive bar printing portions from their first location to their printing location said solenoid member and said driving means thereby being moved in response to the generation of said control signals enabling the printing portion of one of said printing members to print a coded bar on the record member.

* * * * *